(12) United States Patent
Jeričević

(10) Patent No.: US 7,088,097 B2
(45) Date of Patent: Aug. 8, 2006

(54) METHOD FOR FITTING A SUM OF EXPONENTIALS TO EXPERIMENTAL DATA BY LINEARIZATION USING A NUMERICAL INTEGRATION APPROXIMATION, AND ITS APPLICATION TO WELL LOG DATA

(75) Inventor: Zeljko Jeričević, Houston, TX (US)

(73) Assignee: KJT Enterprises, Inc., Houston, TX (US)

(*) Notice: Subject to any disclaimer, the term of this patent is extended or adjusted under 35 U.S.C. 154(b) by 0 days.

(21) Appl. No.: 11/030,718

(22) Filed: Dec. 31, 2004

(65) Prior Publication Data

US 2006/0145695 A1    Jul. 6, 2006

(51) Int. Cl.
*G01V 3/00*    (2006.01)

(52) U.S. Cl. ..................... 324/303; 324/323
(58) Field of Classification Search ............... 324/303, 324/323, 332; 250/296.6
See application file for complete search history.

(56) References Cited

U.S. PATENT DOCUMENTS

| | | | | |
|---|---|---|---|---|
| 3,890,501 A | * | 6/1975 | Johnstone | 250/265 |
| 4,424,444 A | * | 1/1984 | Smith et al. | 250/269.7 |
| 5,585,720 A | | 12/1996 | Edwards | |
| 5,696,448 A | | 12/1997 | Coates et al. | |
| 5,764,058 A | | 6/1998 | Itskovich et al. | |
| 5,973,321 A | * | 10/1999 | Schmidt | 250/269.6 |
| 6,665,616 B1 | | 12/2003 | Mickael | |
| 6,686,738 B1 | | 2/2004 | Edwards | |

OTHER PUBLICATIONS

Foss, S.D., A method of Exponential Curve Fitting by Numerical Integration, Biometrics v. 26, No. 4 pp. 815-821 (Dec. 1970).

* cited by examiner

*Primary Examiner*—Louis M. Arana
(74) *Attorney, Agent, or Firm*—Richard A. Fagin

(57) ABSTRACT

A method for analyzing formations using measurements from a detector in response to energy imparted therein. The measurements have characteristics which exponentially reduce in magnitude with time. The method includes (a) determining, an N-th order integral of the value of each measurement from an initial time to the time of each measurement, wherein N represents a number of exponentially decaying characteristics; b) determining a solution to a system of linear equations relating the measurements to the integrals, the solution representing polynomials of order N related to a decay rate and an initial measurement amplitude for each component; (c) solving the polynomials to determine the decay rate and the initial amplitude for each component; (d) determining if the decay rates and initial amplitudes are within possible limits; and (e) incrementing N and repeating (a) through (d) until the decay rates or the initial amplitudes are not within possible limits.

20 Claims, 2 Drawing Sheets

METHOD FOR FITTING A SUM OF EXPONENTIALS TO EXPERIMENTAL DATA BY LINEARIZATION USING A NUMERICAL INTEGRATION APPROXIMATION, AND ITS APPLICATION TO WELL LOG DATA

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of geophysical analysis of Earth formations and materials. More particularly, the invention relates to method for determining relative amounts of, and exponential decay parameters of Earth materials having one or more component, each of which has a unique exponential decay characteristic.

2. Background Art

Evaluation and analysis of Earth materials and Earth formations include various methods and apparatus for energizing the materials or formations with one or more types of energy, and measuring a response of the materials or formations to the energy. Some types of response are characterized by exponential decay, with respect to time, of a measured parameter related to the interaction of the Earth materials or formations with the particular form of energy. As two non-limiting examples of such measurements, nuclear magnetic resonance (NMR) spin echo amplitude is related with respect to time to the relative quantities of various components in the formations, each of which components can have a unique relationship of NMR spin-echo amplitude with respect to time. Such relationship is typically known as the transverse or longitudinal relaxation rate. The total NMR spin echo amplitude with respect to time measured in a particular material or formation is thus related to the quantity of each uniquely "decaying" component in the Earth material or formation being analyzed, and to the rate at which NMR spin echo amplitude decays with respect to time for each such component in the Earth material being analyzed. An apparatus for measuring NMR response in Earth formations is disclosed in U.S. Pat. No. 6,121,773 issued to Taicher et al., and incorporated herein by reference. See also U.S. Pat. No. 5,585,720 issued to Edwards.

Another example of exponentially decaying measurement parameter with respect to time, in response to energizing Earth materials, is known in the art as pulsed neutron decay measurement. In a system for measuring pulsed neutron response in an Earth material (or formation), controlled-duration impulses or "bursts" of high energy neutrons from a particular type of source are applied to the Earth materials being analyzed. Measurement are made with respect to time, at one or more locations spaced apart from the neutron source, of a response parameter related to the interaction of the high energy neutrons with the Earth materials. Examples of such measurements include capture gamma rays (gamma rays emitted when thermalized neutrons are captured by a susceptible nucleus in the Earth materials) or thermal neutrons. Various properties of the Earth materials can be inferred from the relative decay rates of the various components in the materials. See, for example, U.S. Pat. No. 5,789,752 issued to Mickael.

For the foregoing types of measurements, among others, determining the composition of the Earth materials requires determining the amplitude decay rate of each of the one or more components in the Earth materials being analyzed, as well as the fractional composition of each such component. Thus, the total signal amplitude (or parameter related to amplitude such as count rate in the case of neutron detection) can be represented as a sum of components, each having a unique decay rate and relative concentration (or fractional composition) in the Earth material being analyzed. Expressed mathematically:

$$y(t) = b + \sum_{i=1}^{N} A_i \ e^{-k_i t}$$

in which y(t) represents the signal amplitude at time t, $A_i$ represents the relative concentration or quantity of the i-th component in the materials, and $k_i$ represents an exponential signal amplitude decay rate for the i-th component. b represents a background amplitude constant, which is typically the signal that would be measured after all the response effects of energizing the materials have decayed below an amplitude at which such effects are likely to be detected.

Methods are known in the art for determining the relative quantities of the various exponentially decaying components in a set of measurements relating to Earth material analysis. See the Edwards '720 patent mentioned above as one example. Methods known in the art typically require an explicit limit on the number of exponentially decaying components in a particular material being analyzed, require some initial estimate of the decay rate of the various components in the material, or both. What is needed is a generalized method for analyzing exponentially decaying signals from an Earth material that requires no initial estimates on the number of components or the decay rates of the various components.

SUMMARY OF THE INVENTION

One aspect of the invention is a method for analyzing Earth formations using measurements from a detector made in response to energy imparted into the Earth formations. The measurements have one or more characteristics which exponentially reduce in magnitude (decay) with respect to time at which the Earth formation was energized. The method includes (a) determining an N-th order integral of the value of each measurement from an initial time out to the time of each measurement. N represents a number of exponentially decaying characteristics or components. The method continues with (b) determining a solution to a system of linear equations that relate the measurement values to the integral values. The solution represents polynomial expressions of order N related to a decay rate and an initial measurement amplitude for each exponentially decaying component. The method continues with (c) solving the polynomial expressions to determine the decay rate and the initial measurement amplitude for each component. The method continues with (d) determining if the decay rates and initial amplitudes are within physically possible limits. If the decay rates and initial amplitudes are within physically possible limits, then (e) N is incremented and (a) through (e)

are repeated until any of the decay rates or any of the initial measurements amplitudes are not within physically possible limits.

Another aspect of the invention is a method for analyzing Earth formations. According to this aspect, a well logging instrument including at least one energy source and at least one energy detector are disposed in a wellbore drilled through the Earth formations. The at least one source is actuated to energize the Earth formations. Measurements are made with respect to time of signals from the at least one detector in response to the energizing. The measurements have one or more characteristics which exponentially reduce in magnitude (decay) with respect to time at which the Earth formation was energized by the source. The method includes (a) determining an N-th order integral of the value of each measurement from an initial time out to the time of each measurement. N represents a number of exponentially decaying characteristics or components. The method continues with (b) determining a solution to a system of linear equations that relate the measurement values to the integral values. The solution represents polynomial expressions of order N related to a decay rate and an initial measurement amplitude for each exponentially decaying component. The method continues with (c) solving the polynomial expressions to determine the decay rate and the initial measurement amplitude for each component. The method continues with (d) determining if the decay rates and initial amplitudes are within physically possible limits. If the decay rates and initial amplitudes are within physically possible limits, then (e) N is incremented and (a) through (e) are repeated until any of the decay rates or any of the initial measurements amplitudes are not within physically possible limits.

Other aspects and advantages of the invention will be apparent from the following description and the appended claims.

DETAILED DESCRIPTION

Figure 1:
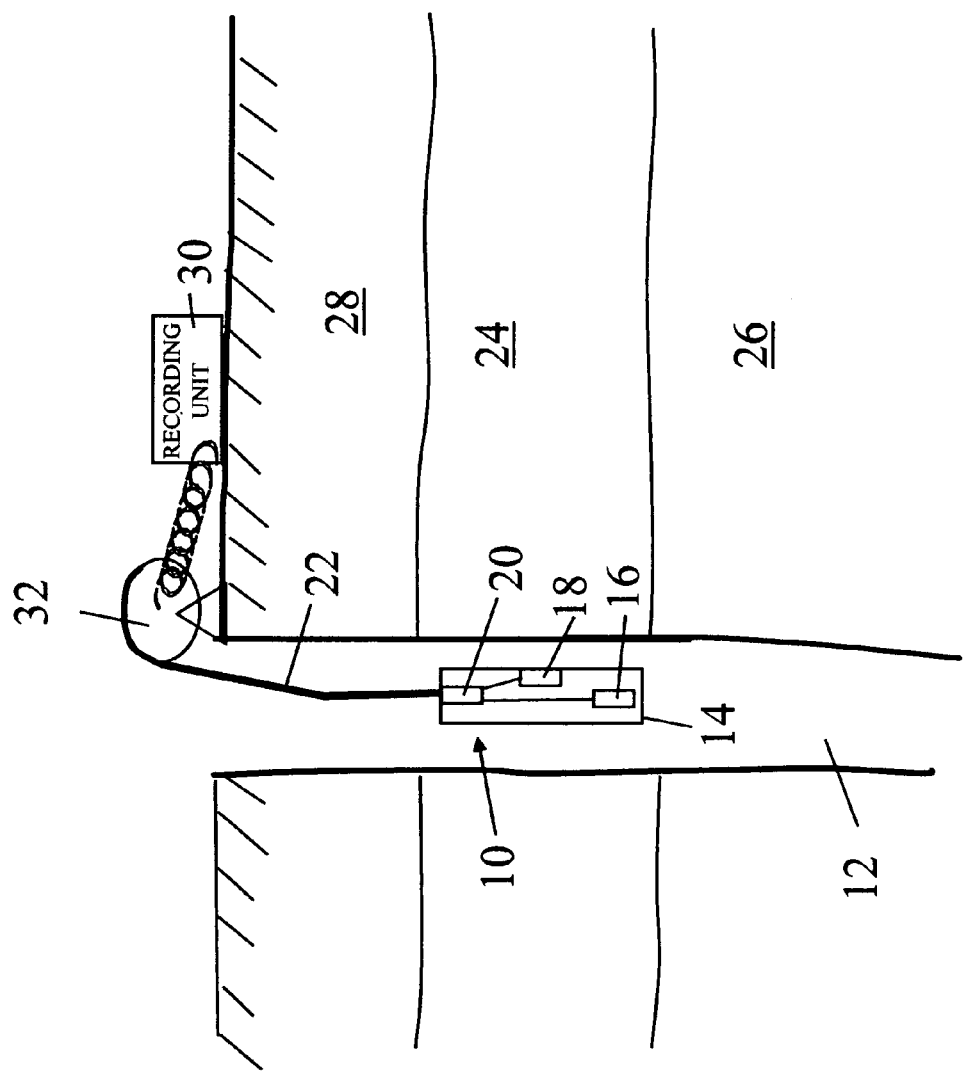
FIG. 1 shows a typical well logging instrument measuring a property of an Earth formation subject to exponential signal decay.

FIG. 1 shows a well logging instrument 10 disposed in a wellbore 12 drilled through various Earth formations 28, 24, 26. The instrument 10 may be conveyed into the wellbore 12 and withdrawn therefrom at one end of an armored electrical cable 22. The cable 22 may be extended and retracted by a winch 32 or similar device known in the art. Electrical conductors (not shown separately) are connected to various measuring and power supply circuits in a recording unit 30 disposed at the Earth's surface. The recording unit 30 may include a computer (not shown separately) for recording and/or interpreting signals transmitted along the cable 22 to the recording unit 30.

The cable 22 and winch 32 are only one form of conveyance of a well logging instrument that may be used with methods according to the invention. Other conveyance devices known in the art include drill pipe (used in "measurement while drilling", production tubing, coiled tubing. The manner of conveyance of the instrument 10 is therefore not in any way a limitation on the scope of the invention.

The instrument 10 typically includes a pressure tight, elongated housing 14 adapted to traverse the wellbore 22. Inside the housing 14 are disposed at least one energy source 16, at least one detector 18, and suitable operating and communication circuits, shown schematically at 20, to control operation of the source (for controllable-operation sources), to control operation of the at least one detector 18, and to condition signals from the detector 18 for recording and/or transmission to the recording unit 30.

In one embodiment, the energy source 16 is a permanent magnet and radio frequency transmitter antenna, coupled to suitable driver circuits (part of the operating circuits 20). In such embodiment, the detector 18 is a radio frequency receiver antenna coupled to suitable receiver circuits (also part of operating circuits 20). The control circuits 20 may include, for example, a pulse programmer, a receiver/detector, telemetry transmitter and other circuits for performing nuclear magnetic resonance (NMR) measurements in the Earth formations 26, 24, 28, and where appropriate, to communicate the measurements to the recording unit 30. Suitable circuits for NMR measurement are disclosed in U.S. Pat. No. 6,121,733 issued to Taicher et al., incorporated herein by reference.

In the present embodiment, the static magnetic field produced by the magnet is used to polarize the Earth formations along a first direction. The radio frequency (RF) antenna is oriented to emit a radio frequency magnetic field transverse to the static magnetic field. The circuits 20 periodically conduct controlled duration pulses of RF power through the antenna. The Earth formations are thus repeatedly transversely magnetically polarized with the RF magnetic field to induce nuclear magnetic resonance spin echo phenomena in the Earth formations. The antenna can be alternately coupled to the receiver circuit (not shown separately) to detect RF energy emitted by the spin echoes. Amplitudes of the spin echoes are inferred form the RF detection amplitude, and can be used in some embodiments as will be further explained below.

In another embodiment, the source 16 is a controllable source of high energy neutrons, and the at least one detector 18 is a gamma photon detector. Typically, such embodiment will include at least two such gamma photon detectors each at a different longitudinal spacing from the source 16. Other embodiments may include neutron detectors such as Helium-3 proportional counters instead of gamma photon detectors. Suitable circuits 20 include detector pulse amplitude measuring circuits, and/or pulse rate counters. Such embodiments are typically used to measure neutron energy decay rate or a related parameter. One suitable instrument for measuring such neutron energy decay rate is described in U.S. Pat. No. 5,789,752 issued to Mickael. In such embodiments, the source 16 is actuated to periodically bombard the formations with controlled duration bursts of high energy neutrons. The detector(s) 18 can detect either numbers of capture gamma rays, or numbers of neutrons within selected time and/or energy windows. The counting rates, and the rate of decay or decrease of such counting rates, are used to infer various properties of the Earth formations.

Irrespective of the type of energy source, and the type and number of detectors used, for purposes of describing the invention, it is only necessary that the measurements have some characteristic or property which changes exponentially (typically decreasing in quantity or amplitude) with respect to time. In various measurements of physical parameters of Earth formations, the change in the quantity with respect to time (typically called "decay") is often characterized by more than one component, and the number of such components may not be known beforehand. Each of the components is characterized by a different "decay rate", meaning that the rate of decrease of the measured quantity with respect to time is unique to each component. The quantity or fractional amount of each component is what is to be determined by the analysis. A typical set of measurements of the parameter, therefore, may be characterized by a composite exponential decrease with respect to time, which is related to the fractional amount of each component and the unique decay rate for each such component. Methods according to the invention are used to determine the relative quantity of each such component and the decay rate of each such component. By identifying the decays rate of each component, it is possible to infer the nature of the component as well, which is another objective of the analysis. The description which follows is explanation of the mathematical basis of the method according to the invention. The description begins by showing mathematical expressions for expected signal decay for each of one component, two component, three component and four component exponential decay functions, and how to determine the fractional amounts and decay rates for each component only from the measurement decay curve. The description then explains a general form of the analysis, for which an a priori unknown number of components and decay rates is determined from a set of measurements.

A generalized solution can be explained beginning with a mathematical description of a single component exponential decay system. A single component exponential decay function having a "background" term (a non-zero constant) can be represented by the expression:

$$y(t) = Ae^{-kt} + b \tag{1}$$

in which y(t) represents the signal or measurement magnitude at any time (t), A represents an initial measurement amplitude at time t=0, k represents the decay constant for the component, and b represents the background term. Background terms are typically part of measurements of nuclear radiation effects, for example, because measurements of such effects are non-zero even when no energy is imparted into the formation by the source (16 in FIG. 1). Other sources of background may be thermal noise in detections circuits. Integrating equation (1) provides the expression:

$$\int y dt = A\int e^{-kt} dt + b\int dt \tag{2}$$

$$\int y dt = \frac{A}{k}(1.0 - e^{-kt}) + bt \tag{3}$$

$$k\int y dy = -Ae^{-kt} - b + b + A + kbt \tag{4}$$

Substituting the following approximation for y into equation (4) provides the expression:

$$-y \approx -Ae^{-kt} - b \tag{4A}$$

Integrating provides the expression:

$$y \approx -k\int y dt + kbt + A + b \tag{5}$$

Equation (5) above can be applied to each data point y(t) in a measurement data set in the following manner:

$$y(t_j) \approx -k\int_{t=0}^{t=t_j} y(t) dt + kbt_j + A + b \tag{6}$$

In the present embodiment, a value of the integral of the measurements $y(t_j)$ from time t=0 to time $t=t_j$ is determined, for example using a trapezoidal approximation or other numerical integration technique. The integral values are then used to set up, and ultimately solve, a system of linear equations generally in the form of equation (6). The numerical integration procedure usually results in an overdetermined system of linear equations with the following solution:

$$p_1 = -k \tag{7A}$$

$$p_2 = bk \tag{7B}$$

$$p_3 = b + A \tag{7C}$$

The solutions to the system of equations, $p_1$, $p_2$, $p_3$ themselves are a solution vector of a system of equations for A, k and b, as can be inferred from equations 7A, 7B and 7C. By solving the system of equations 7A, 7B and 7C, the values for k, A and b can be determined explicitly.

Having shown a solution for a single component exponential system, description of two, three and four component exponential systems will follow. In all the equations which follow, subscripts for y and the limits of the integrations provided above are omitted for simplicity, but the respective subscripts and limits are used in actual calculations in the manner described above. Thus for a single component exponential decay measurement set, solution to a system of three equations of the first order determines unique values of decay constant, initial amplitude and background amplitude.

A two component exponential decay function with a background term can be represented by the following expression:

$$y = A_1 e^{-k_1 t} + A_2 e^{-k_2 t} + b \tag{8}$$

Integration of equation (8) provides the expressions:

$$\int y dt = A_1 \int e^{-k_1 t} dt + A_2 \int e^{-k_2 t} dt + b\int dt \tag{9}$$

$$\int y dt = \frac{A_1}{k_1}(1.0 - e^{-k_1 t}) + \frac{A_2}{k_2}(1.0 - e^{-k_2 t}) + bt \tag{10}$$

$$k_1 k_2 \int y dt = k_2 A_1 - k_2 A_1 e^{-k_1 t} + k_1 A_2 - k_1 A_2 e^{-k_2 t} + k_1 k_2 bt \tag{11}$$

$$k_1 k_2 \int y dt = k_2 (A_1 + b - b - A_1 e^{-k_1 t} - A_2 e^{-k_2 t} + A_2 e^{-k_2 t}) + k_1 (A_2 + b - b - A_1 e^{-k_1 t} - A_2 e^{-k_2 t} + A_1 e^{-k_1 t}) + k_1 k_2 bt \tag{12}$$

Substituting for y the approximation:

$$-y \approx -A_1 e^{-k_1 t} - A_2 e^{-k_2 t} - b \tag{12A}$$

provides the expression:

$$k_1 k_2 \int y dt \approx k_2(A_1 + b - y) + k_2 A_2 e^{-k_2 t} + k_1(A_2 + b - y) + k_1 A_1 e^{-k_1 t} + k_1 k_2 bt \tag{13}$$

Second integration provides the expression:

$$k_1 k_2 \int\int y dt dt \approx k_2(A_1 + b)\int dt - k_2 \int y dt + A_2(1.0 - e^{-k_2 t}) + k_1 (A_2 + b)\int dt - k_1 \int y dt + A_1(1.0 - e^{-k_1 t}) + k_1 k_2 b \int t dt \tag{14}$$

$$k_1 k_2 \int\int y dt dt \approx t\{k_2(A_1 + b) + k_1(A_2 + b)\} - (k_1 + k_2)\int y dt + \frac{k_1 k_2 b t^2}{2} - y + A_1 + A_2 + b \tag{15}$$

-continued $$y \approx -(k_1+k_2)\int y dt - k_1 k_2 \int\int y dt dt + \quad (16)$$
$$A_1+A_2+b+t\{k_2(A_1+b)-k_1(A_2+b)\}+\frac{k_1 k_2 b t^2}{2}$$

Thus, for a two-component exponential decay measurement set, a series of double integrals is determined using numerical integration, and a set of intermediate parameters may be determined by solving a set of linear equations relating the measurement values, the numerical integral values and the above equations. A solution of the system of linear equations is provided as:

$$p_1=-k_1-k_2 \quad (17)$$

$$p_2=-k_1 k_2 \quad (18)$$

$$p_3=b+A_1+A_2 \quad (19)$$

$$p_4=b(k_1+k_2)+A_1 k_2+A_2 k_1 \quad (20)$$

$$p_5=\frac{b k_1 k_2}{2} \quad (21)$$

The system of equations above represents a second order polynomial expression with respect to k. In second order (two component) and higher order systems, values of k may be determined from the p values by eigenvalue problem formulation (singular value decomposition) and the A and b terms can be determined by solution of another system of linear equations.

Performing a similar integration and linearization on a three component exponential function with a background term, according to the expression:

$$y=A_1 e^{-k_1 t}+A_2 e^{-k_2 t}+A_3 e^{-k_3 t}+b \quad (22)$$

will provide the following solution of the linear system of equations:

$$p_1=-k_1-k_2-k_3 \quad (23)$$

$$p_2=-k_1 k_2-k_1 k_3-k_2 k_3 \quad (24)$$

$$p_3=-k_1 k_2 k_3 \quad (25)$$

$$p_4=b+A_1+A_2+A_3 \quad (26)$$

$$p_5=b(k_1+k_2+k_3)+A_1(k_2+k_3)+A_2(k_1+k_3)+A_3(k_1+k_2) \quad (27)$$

$$p_6=\frac{1}{2}\{b(k_1 k_2+k_1 k_3+k_2 k_3)+A_1 k_2 k_3+A_2 k_1 k_3+A_3 k_1 k_2\} \quad (28)$$

$$p_7=\frac{b k_1 k_2 k_3}{6} \quad (29)$$

Similarly, a four component exponential decay function with background term:

$$y=A_1 e^{-k_1 t}+A_2 e^{-k_2 t}+A_3 e^{-k_3 t}+A_4 e^{-k_4 t}+b \quad (30)$$

will provide the following solution of linear system of equations:

$$p_1=-k_1-k_2-k_3-k_4 \quad (31)$$

$$p_2=-k_1 k_2-k_1 k_3-k_1 k_4-k_2 k_3-k_2 k_4-k_3 k_4 \quad (32)$$

$$p_3=-k_1 k_2 k_3-k_1 k_2 k_4-k_1 k_3 k_4-k_2 k_3 k_4 \quad (33)$$

$$p_4=-k_1 k_2 k_3 k_4 \quad (34)$$

$$p_5 b+A_1+A_2+A_3+A_4 \quad (35)$$

$$p_6=b(k_1+k_2+k_3+k_4)+A_1(k_2+k_3+k_4)+A_2(k_1+k_3+k_4)+A_3(k_1+k_2+k_4)+A_4(k_1+k_2+k_3) \quad (36).$$

$$p_7=\frac{1}{2}\{b(k_1 k_2+k_1 k_3+k_1 k_4+k_2 k_3+k_2 k_4+k_3 k_4)+ \quad (37)$$
$$A_1(k_2 k_3+k_2 k_4+k_3 k_4)+A_2(k_1 k_3+k_1 k_4+k_3 k_4)+$$
$$A_3(k_1 k_2+k_1 k_4+k_2 k_4)+A_4(k_1 k_2+k_1 k_3+k_2 k_3)\}$$

$$p_8=\frac{1}{6}\{b(k_1 k_2 k_3+k_1 k_2 k_4+k_1 k_3 k_4+k_2 k_3 k_4)+ \quad (39)$$
$$A_1 k_2 k_3 k_4+A_2 k_1 k_3 k_4+A_3 k_1 k_2 k_4+A_4 k_1 k_2 k_3\}$$

$$p_9=\frac{b k_1 k_2 k_3 k_4}{24} \quad (40)$$

The above expressions are related to measurements, such as nuclear radiation measurements, in which there is a background term. In the case where no background term is used, for a one component exponential decay function in the form:

$$y=A e^{-kt} \quad (41)$$

the solution of a linear system of equations will be:

$$p_1=-k \quad (42)$$

$$p_2=A \quad (43)$$

For a two component exponential decay function without a background term in the form:

$$y=A_1 e^{-k_1 t} A_2 e^{-k_2 t} \quad (44)$$

the solution of a linear system of equations will be"

$$p_1=-k_1-k_2 \quad (45)$$

$$p_2=-k_1 k_2 \quad (46)$$

$$p_3=A_1+A_2 \quad (47)$$

$$p_4=A_1 k_2+A_2 k_1 \quad (48)$$

For a three component exponential decay function without background term, in the form:

$$y=A_1 e^{-k_1 t}+A_2 e^{-k_2 t}+A_3 e^{-k_3 t} \quad (49)$$

the solution of a linear system of equations will be:

$$p_1=-k_1-k_2-k_3 \quad (50)$$

$$p_2=-k_1 k_2-k_1 k_3-k_2 k_3 \quad (51)$$

$$p_3=-k_1 k_2 k_3 \quad (52)$$

$$p_4=A_1+A_2+A_3 \quad (53)$$

$$p_5=A(k_2+k_3)+A_2(k_1+k_3)+A_3(k_1+k_2) \quad (54)$$

$$p_6=\frac{1}{2}(A_1 k_2 k_3+A_2 k_1 k_3+A_3 k_1 k_2) \quad (55)$$

For a four component exponential decay function without background term, in the form:

$$y=A_1 e^{-k_1 t}+A_2 e^{-k_2 t}+A_3 e^{-k_3 t} A_4 e^{-k_4 t} \quad (56)$$

the solution of linear system of equations will be:

$$p_1 = k_2 - k_2 - k_3 - k_4 \tag{57}$$

$$p_2 = -k_1 k_2 - k_1 k_3 - k_1 k_4 - k_2 k_3 - k_2 k_4 - k_3 k_4 \tag{58}$$

$$p_3 = -k_1 k_2 k_3 - k_1 k_2 k_4 - k_1 k_3 k_4 - k_2 k_3 k_4 \tag{59}$$

$$p_4 = -k_1 k_2 k_3 k_4 \tag{60}$$

$$p_5 = A_1 + A_2 + A_3 + A_4 \tag{61}$$

$$p_6 = A_1(k_2 + k_3 + k_4) + A_2(k_1 + k_3 + k_4) + A_3(k_1 + k_2 + k_4) + A_4(k_1 + k_2 + k_3) \tag{62}$$

$$p_7 = \frac{1}{2}\{A_1(k_2 k_3 + k_2 k_4 + k_3 k_4) A_2(k_1 k_3 + k_1 k_4 + k_3 k_4) + A_3(k_1 k_2 + k_1 k_4 + k_2 k_4) + A_4(k_1 k_2 + k_1 k_3 + k_2 k_3)\} \tag{63}$$

$$p_8 = \frac{1}{6}(A_1 k_2 k_3 k_4 + A_2 k_1 k_3 k_4 + A_3 k_1 k_2 k_4 + A_4 k_1 k_2 k_3) \tag{64}$$

Having thus shown individual solutions for an a priori known number of components, a general case for an a priori unknown number of components will now be explained.

The number of combinations of k elements taken from n elements without repetition is determined by the expression:

$$^{n}C_k = \frac{n!}{(n-k)!k!} \tag{65}$$

A sum of exponentials with a background term b, the sum being expressed as:

$$y = b + \sum_{i=1}^{N} e^{-k_i t} \tag{66}$$

has a solution which may be expressed as follows:

$$p_1 = -\sum_{i=1}^{N} k_i$$

$$p_n = -\sum_{i=1}^{\frac{N!}{(N-n)!n!}} \prod_{1}^{n} k_m \quad m \in (^{N}C_n) \tag{67}$$

$$p_N = -\prod_{i=1}^{N} k_i \tag{68}$$

$$p_{N+1} = b + \sum_{i=1}^{N} A_i \tag{69}$$

$$p_{N+2} = b\sum_{i=1}^{i=N} k_i + \sum_{i=1}^{i=N} A_i \sum_{j=1; j \neq i}^{N} k_j \tag{70}$$

$$p_{N+n} = \frac{1}{(n-1)!}\left\{ b\sum_{j=1}^{\frac{N!}{(N-n)!n!}} \prod_{1}^{n-1} k_l + \sum_{i=1}^{N} A_i \sum_{j=1;}^{\frac{(N-1)!}{(N-n)!(n-1)!}} \prod_{1}^{n-1} k_m \right\} l \in \tag{71}$$

$$(^{N}C_n) \; m \in (^{N-1}C_{n-1}; m \neq i)$$

$$p_{2N} = \frac{1}{(N-1)!}\left\{ b \sum_{i=1}^{\frac{N!}{(N-1)!}} \prod_{1}^{N-1} k_m + \sum_{i=1}^{N} A_i \prod_{j=1; j \neq i}^{N} k_j \right\} m \in (^{N}C_{N-1}) \tag{72}$$

$$p_{2N+1} = -\frac{b}{N!}\prod_{i=1}^{N} k_i \tag{73}$$

A template for row elements in a system matrix for an N component exponential model having a background term is shown below:

$$\int y dt \int \int y dt dt \int \int \int y dt dt dt \ldots,$$
$$\text{Nthorder} \int 1.0 t t^2 \ldots, t^{N-1} t^N \tag{74}$$

A model can be expressed as a sum of exponential components without a background term as in the following the expression:

$$y = \sum_{i=1}^{N} e^{-k_i t} \tag{75}$$

and a solution to the model can be shown as follows:

$$p_1 = -\sum_{i=1}^{N} k_i \tag{76}$$

$$p_n = -\sum_{i=1}^{\frac{N!}{(N-n)!n!}} \prod_{1}^{n} k_m \quad m \in (^{N}C_n) \tag{77}$$

$$p_N = -\prod_{i=1}^{N} k_i \tag{78}$$

$$p_{N+1} = \sum_{i=1}^{N} A_i \tag{79}$$

$$p_{N+2} = \sum_{i=1}^{i=N} A_i \sum_{j=1; j \neq i}^{N} k_j \tag{80}$$

$$p_{N+n} = \frac{1}{(n-1)!}\sum_{i=1}^{N} A_i \sum_{j=1;}^{\frac{(N-1)!}{(N-n)!(n-1)!}} \prod_{1}^{n-1} k_m \quad m \in (^{N-1}C_{n-1}; m \neq i) \tag{81}$$

$$p_{2N} = \frac{1}{(N-1)!}\sum_{i=1}^{N} A_i \prod_{j=1; j \neq i}^{N} k_j \tag{82}$$

A template for row elements in a system matrix for an N component exponential system without a background term is shown below:

$$\int y dt \int \int y dt dt \int \int \int y dt dt dt \ldots,$$
$$\text{Nthorder} \int 1.0 t t^2 \ldots, t^{N-1} \tag{83}$$

Figure 2:
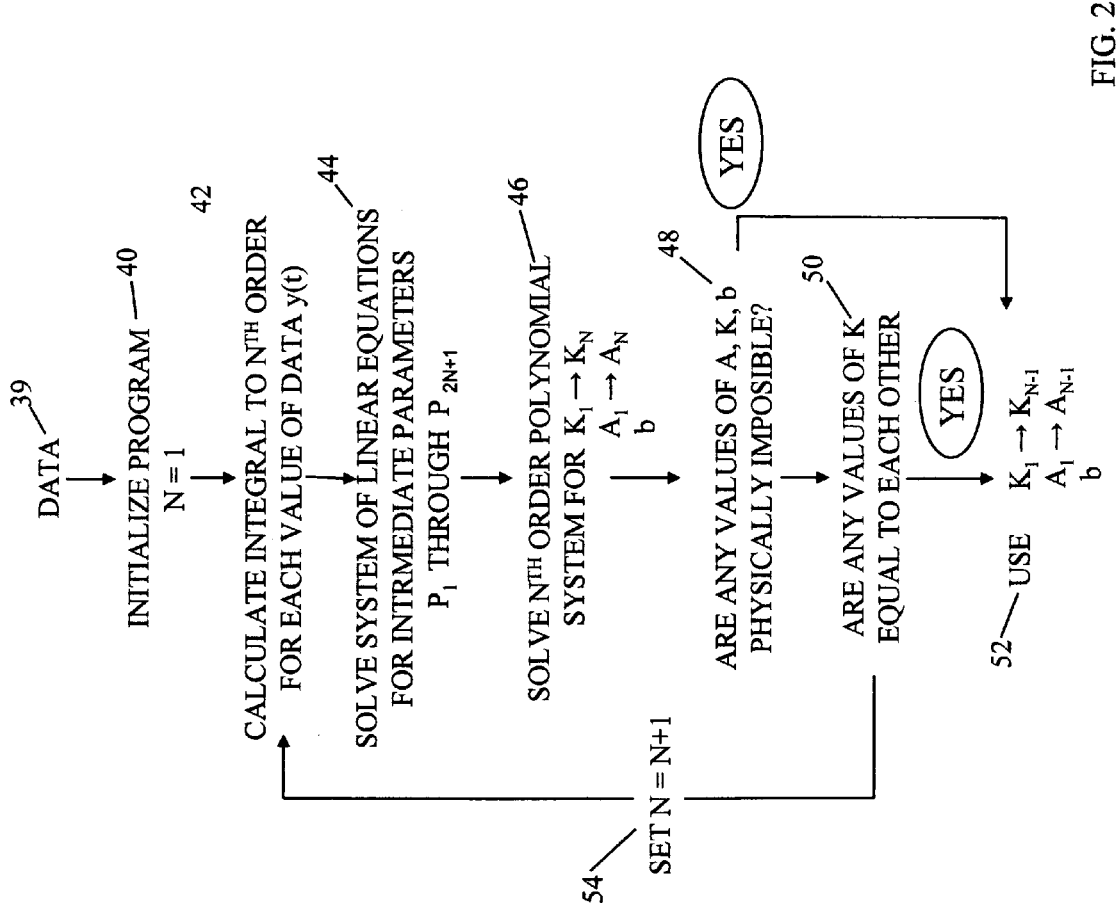
FIG. 2 shows a flow chart of one implementation of a solution technique according to the invention.

To implement a general solution in order to analyze well log data according to the invention, an example embodiment is shown in flow chart form in FIG. 2. The well log measurement data, shown at 39, may include measurements such as NMR spin echo amplitude, capture gamma ray counting rate, or neutron counting rate, as explained above with reference to FIG. 1. The values of the well log measurements are typically ordered with respect to time. Time is typically referenced to actuation of the source (16 in FIG. 1) or some other initialization reference. In a first operation of the method, a number of exponential components (N) in the data is set equal to one, as shown at 40. For each measurement value, at 42, an N-th order integral of the data is calculated from time t=0 to the time of each measurement (data point). In the first operation, the numerical integral will be a single integral. The values of the integral, and the measurement values at each corresponding time are used to set up a system of linear equations. The system is solved, at 44, to obtain intermediate parameters $p_1$ through $p\,2_{N+1}$. The intermediate parameters form N-th order polynomial expressions in terms of the values of A (the initial amplitude of each exponentially decaying component), k (the decay constant for each component) and the background b. The N-th order polynomial expressions for A, k and b are then solved to determine the values of A, k and b. In the present embodiment, at 48, values of A, k and b are examined to determine if any of them is physically impossible, for example less than zero. If so, at 52 the solutions for A, k and b for the next lower order polynomial system is used as the solution to the measurement system, meaning that N−1 exponentially decaying components are determined, having decay rates $k_1$ through $k_{N-1}$ and respective initial amplitudes (correlated to fractional amount of the total composition of the Earth materials being analyzed) $A_1$ through $A_{N-1}$.

If all of the values of A, k and b are within physically possible limits, at 50 the values of k are examined to determine if any two of them are substantially the same. If any two values of k are substantially the same, then at 52, the previous order (N−1) solutions for A, k and b are used. The k values thus determined represent a physical characteristic of one of the exponentially decaying components in the Earth formation, for example, salt-saturated connate water. The A values can correspond to the fractional amount of each such component with respect to mass or volume of the Earth formation.

At 54, if none of the k values is substantially the same as any other k value, and if all of the parameters calculated are within physically possible limits, then the number of components, N, is incremented by one, and the process repeats at 42.

A particular implementation of a method according to FIG. 2 takes into account that well logging sensors have a distribution of sensitivity of response. Distribution of response means that the total response of the sensor is a sum of responses from every point in space about the sensor. Each point will have a relative contribution as compared with the relative contribution of every other point that is dependent on the physical arrangement of the sensor and the energy source, among other factors. What is significant about the spatial distribution of response of a sensor, and particularly of well logging sensors, is that measurements made by such sensors made while moving along a wellbore or relative to an object being evaluated represent, to a substantial degree, the same physical system as measurements made at adjacent positions along the wellbore or along the object being evaluated. As a practical matter, therefore, upon determining the number of and the magnitudes of exponential decay rates in an earth formation adjacent to a wellbore, such numbers of and magnitudes of the decay rates ($k_i$) will substantially not change from one measurement position to the next. What typically does change, however, are the coefficients, or preexponential terms ($A_i$) as the relative fractional amounts of each component in the formations changes at each successive measurement point along the wellbore. In the present implementation, the calculations may be substantially simplified by initializing the calculation using the exponential decay rates ($k_i$) from the immediately previous measurement position, and recalculating only the preexponential terms ($A_i$). Such calculation procedure may continue until one or more of the preexponential terms (initial magnitudes) becomes zero, or drops below a selected threshold value, at which point the entire procedure as explained with reference to FIG. 2 may be implemented again for a particular measurement position.

In one embodiment of such extended method, the well logging sensor may be assumed to have a defined response distribution in a direction along the axis of the wellbore, and a circumferential response that is substantially symmetric about the axis of the wellbore. Calculations of physical properties of the Earth formations may be made in a "window" representing a selected number of measurement positions along the axis of the wellbore. In this embodiment, the preexponential values and the decay rates may be calculated, for example, at a center position within the window, and the preexponential values may be calculated for all other measurement positions along the window. As the well logging instrument is moved along the wellbore, measurement points may be added and removed along the direction of motion of the well logging instrument and the process may be repeated for each such window of measurement positions. The above matrix equations are valid for one data set (single time series of M points) at a time.

For the windowing embodiment of the method described above, the system matrix and y (measurement) vector can be somewhat more complicated. All the data can be processed together, and time series of y(t) are concatenated into vector y one after another while the system matrix can be built in separated blocks containing integrals and powers of t, respectively.

A block matrix implementation of the method for an N-component exponential model including a background term and L number of simultaneous data sets in a measurement window can be expressed as:

$$\begin{pmatrix} y_1 \\ y_2 \\ \ldots \\ y_L \end{pmatrix} = \begin{pmatrix} \int_1 & t_1 & 0 & \ldots & 0 & t_L^N \\ \int_2 & 0 & t_2 & \ldots & 0 & t_L^N \\ \ldots & \ldots & \ldots & \ldots & \ldots & \ldots \\ \int_L & 0 & 0 & \ldots & t_L & t_L^N \end{pmatrix} \begin{pmatrix} p_k \\ p_{A,1} \\ p_{A,2} \\ \ldots \\ p_{A,L} \\ b \end{pmatrix}$$

Where the y values are one column of blocks of M length (M is number of points in each individual time series) containing time series measurements. Integrals are blocks of size M by N (where N is number of exponentially decaying components) containing multiple integrals of time series and t are blocks of size M by N containing powers of independent variable.

The last column in the above system matrix contains N-th power of independent variable t. This column is used only for models which include a background term.

Solution of the system is a multiple block vector containing parameters which are common for all data sets ($p_k$ and b) and the elements containing pre-exponential parameters ($p_{A,i}$), which are different for each time series for a different measurement position.

Block matrix implementation for N exponential components and L simultaneous data sets without a background term is:

$$\begin{pmatrix} y_1 \\ y_2 \\ \ldots \\ y_L \end{pmatrix} = \begin{pmatrix} \int_1 & t_1 & 0 & \ldots & 0 \\ \int_2 & 0 & t_2 & \ldots & 0 \\ \ldots & \ldots & \ldots & \ldots & \ldots \\ \int_L & 0 & 0 & \ldots & t_L \end{pmatrix} \begin{pmatrix} P_k \\ P_{A,1} \\ P_{A,2} \\ \ldots \\ P_{A,L} \end{pmatrix}$$

Computation of exponential (k) and pre-exponential parameters (A) from parameters p is performed as described above.

Methods according to the invention can provide accurate, rapid analysis of fractional amounts of a priori unknown numbers of components of Earth materials each having an a priori unknown exponential signal decay rate. Methods according to the invention are useful in analyzing relative amounts of and the types of various Earth formation components where the components respond to energy by emitting a detectable signal that exponentially reduces in amplitude with respect to time.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for analyzing Earth formations using measurements from a detector in response to energy imparted into the Earth formations, the measurements having at least one characteristic which exponentially reduces in magnitude with respect to time from imparting the energy, the method comprising:
   (a) determining, for each measurement, an N-th order integral of the value of the measurement from an initial time to the time of each measurement, wherein N represents a number of exponentially decaying measurement components in the Earth formations;
   (b) determining a solution to a system of linear equations relating the measurements to the integrals, the solution representing polynomial expressions of order N related to a decay rate and an initial measurement magnitude for each component;
   (c) solving the polynomial expressions to determine the decay rate and the initial measurement magnitudes for each component;
   (d) determining if the decay rates and initial magnitudes are within physically possible limits; and
   (e) incrementing the number of components, N, and repeating (a) through (e) until at least one of the decay rates or at least one of the initial magnitudes is not within physically possible limits.

2. The method of claim 1 wherein the decay rates and initial magnitudes are determined for the Earth formations as the highest order N for which all the decay rates and initial magnitudes are within physically possible limits.

3. The method of claim 1 wherein the physically possible limits comprise values above zero.

4. The method of claim 1 wherein the physically possible limits comprise each value of decay rate being different from every other decay rate.

5. The method of claim 1 wherein the measurements comprise neutron capture gamma ray counting rates.

6. The method of claim 1 wherein the measurements comprise neutron detection counting rates.

7. The method of claim 1 wherein the measurements comprise nuclear magnetic resonance spin echo amplitudes.

8. The method of claim 1 wherein an initial value of N is set equal to one.

9. The method of claim 1 further comprising:
   for measurements made at a position proximate to a detector measurement position at which exponential decay rates and initial magnitudes are determined, setting decay rates equal to the determined decay rates; and
   calculating new values of initial magnitudes.

10. The method of claim 9 further comprising repeating the calculating the new values of initial magnitudes for other measurement positions until at least one calculated initial magnitude drops below a selected threshold.

11. A method for analyzing Earth formations comprising:
   (a) inserting a well logging instrument into a wellbore drilled through the Earth formations;
   (b) energizing the Earth formations with a source of energy;
   (c) measuring a parameter related to a response of the Earth formations to the energizing, the parameter including at least one characteristic which reduces in magnitude with respect to an elapsed time from the energizing;
   (d) determining, for each measurement, an N-th order integral of the value of the measurement from an initial time to the time of each measurement, wherein N represents a number of exponentially decaying measurement components in the Earth formations;
   (e) determining a solution to a system of linear equations relating the measurements to the integrals, the solution representing polynomial expressions of order N related to a decay rate and an initial measurement amplitude for each component;
   (f) solving the polynomial expressions to determine the decay rate and the initial measurement amplitude for each component;
   (g) determining if the decay rates and initial amplitudes are within physically possible limits; and
   (h) incrementing the number of components, N, and repeating (d) through (h) until at least one of the decay rates or at least one of the initial amplitudes is not within physically possible limits.

12. The method of claim 11 wherein the decay rates and initial magnitudes are determined for the Earth formations as the highest order N for which all the decay rate and initial magnitudes are within physically possible limits.

13. The method of claim 11 wherein the physically possible limits comprise values above zero.

14. The method of claim 11 wherein the physically possible limits comprise each value of decay rate being different from every other decay rate.

15. The method of claim 11 wherein the energizing comprises bombarding the formation with controlled duration bursts of high energy neutrons and the measuring comprises detecting neutron capture gamma rays.

16. The method of claim 11 wherein the energizing comprises bombarding the formation with controlled duration bursts of high energy neutrons and the measuring comprises detecting neutrons.

17. The method of claim 11 wherein the energizing comprises polarizing the formations with a static magnetic field along a first direction, and repeatedly transversely polarizing the formation with a controlled duration radio frequency magnetic field, and the measuring comprises detecting nuclear magnetic resonance spin echoes.

18. The method of claim 11 wherein an initial value of N is set equal to one.

19. The method of claim 11 further comprising:
using measurements made at a position proximate to a detector measurement position at which exponential decay rates and initial magnitudes are determined, setting decay rates equal to the determined decay rates; and
calculating new values of initial magnitudes.

20. The method of claim 19 further comprising repeating the calculating the new values of initial magnitudes for other measurement positions until at least one calculated initial magnitude drops below a selected threshold.

* * * * *